March 13, 1928. 1,662,248
C. C. JACOB
WEIR DIFFERENTIAL GAUGE
Filed Aug. 25, 1920
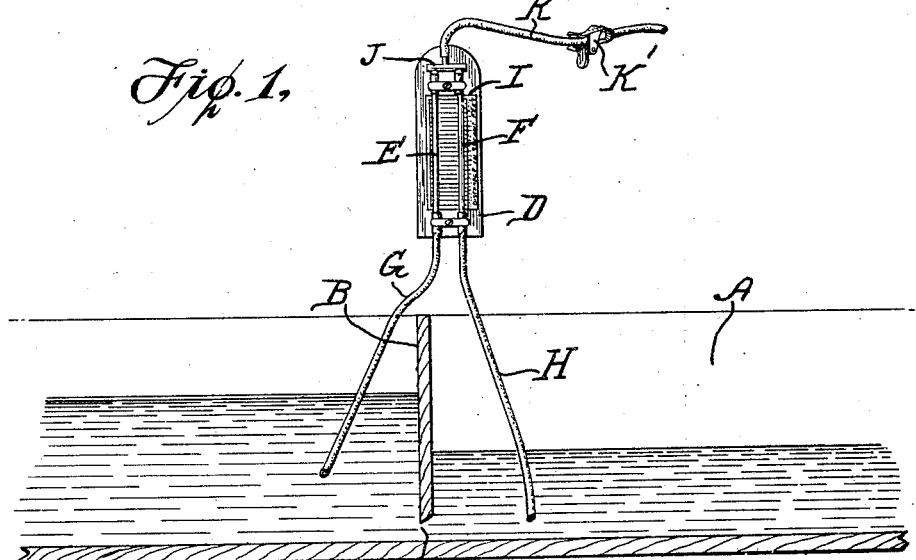
Fig. 1,
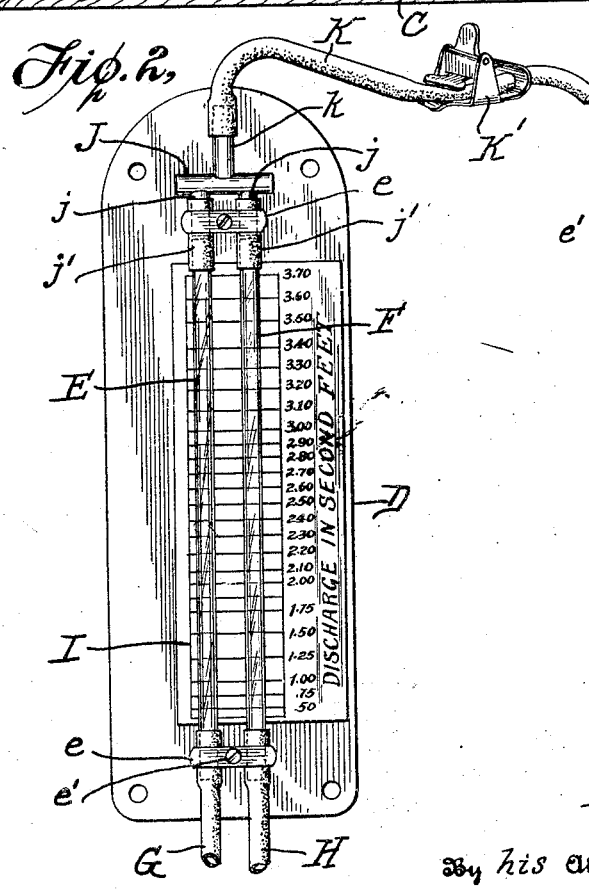
Fig. 2,
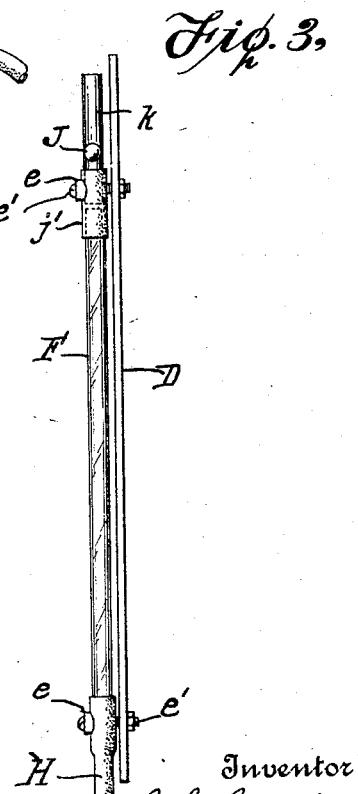
Fig. 3,
Inventor
C. C. Jacob
By his Attorney
H. F. Bernhard Patented Mar. 13, 1928.

1,662,248

UNITED STATES PATENT OFFICE.

CLARENCE C. JACOB, OF MYTON, UTAH.

WEIR DIFFERENTIAL GAUGE.

Application filed August 25, 1920. Serial No. 405,982.

This invention is a gauge for indicating the rate of flow per unit of time of water flowing through a restricted orifice or opening in a weir or dam, the object in view being to afford a direct reading of the water flow on a chart which constitutes a part of the gauge or instrument.

According to this invention, a base board is provided with a plurality of tubular members and with a chart or scale the latter being in operative relation to said tubular members. With said tubular members there is associated means for exhausting air, and connected with said tubular members are suitable feed pipes (preferably flexible tubes) which lead from the base board to a stream of water so that the intake ends of said feed pipes are submerged in the water of a stream or water course, one of said feed pipes receiving the water above the dam and the other feed pipe being supplied with water from below the dam. Air having been exhausted from the tubular members and from the flexible feed pipes until the water above the dam rises in one tubular member to the lowest indication on the chart, the head off water above and below the dam results in the inflow of water into the tubular members so as to rise to different levels therein, whereby the reading on the scale indicates the flow of water in cubic feet per second through the orifice or opening in the dam, the scale being appropriately graduated.

Other functions and advantages of the invention will appear from the following description taken in connection with the drawings, wherein—

Figure 1 is a diagrammatic view, partly in section, of my differential water gauge in operative relation to a weir or dam of a water course, such as an irrigating ditch.

Figure 2 is a front elevation, on an enlarged scale, of the gauge, and

Figure 3 is a view in edge elevation looking at the right of Figure 2.

In Figure 1 of the drawings, A is a water course, such as an irrigation ditch, and B is a dam or weir provided with an orifice or opening C, through which water is free to flow, and the volume of which it is desired to ascertain. The dam restrains the flow of water so that the volume and head is greater above the dam than below said dam, although the flow of water is continuous through the orifice C, as a result of which reduction in flow through the orifice the water below the dam is in reduced volume and under decreased head or pressure.

The gauge or indicating means shown more clearly in Figures 2 and 3 embodies a base board D, a plurality of tubular members E, F, a plurality of feed pipes or tubes G, H, means for exhausting air from said tubular members and the feed pipes, and a chart or scale I unitary with the base board and in cooperative relation to said tubular members.

The base board is composed of metal, or other material suitable for the purpose, said base board being supported by any suitable means adjacent the water course and said baseboard being positioned usually above the dam or weir, see Figure 1.

The tubular members E F are in the form of glass tubes, or any transparent or translucent material suitable for the purpose. Said tubular members are retained fixedly on the base board and in vertical positions thereon, parallel to each other. As shown, the tubular members are positioned quite close together, and they are mounted by clamping plates $e$ spanning the members, said plates being held on the base board by screws $e'$.

The feed pipes G H are composed, preferably, of rubber or other flexible material, the feed pipe G being connected to the lower end of tublar member E, whereas the other feed pipe H is similarly connected to tubular member F, see Figures 1 and 2. As shown, the flexible tubes are slipped over the tubular members and held thereon by one of the clamping plates $e$. The feed pipes are sufficiently long to extend from the gauge to the water course, in order that the pipe G may be submerged in the water above the dam whereas the other feed pipe is submerged in the water below the dam, see Figure 1.

The scale or chart I is composed of paper or other material suitable for the purpose, and it is mounted on the baseboard and in the rear of the tubular members, said scale being attached by suitable means to the baseboard so as to occupy a fixed relation to the tubular members, although the scale is intended to be removed at will. The scale is calibrated to indicate the rate of flow of the water in cubic feet per second through the restricted orifice of the dam, the calibrations on the scale crossing the tubular members in the rear thereof so as to be plainly visible, see Figure 2.

Suitable means are provided for exhausting air from the tubular members and the feed pipes, one embodiment of such means being shown in the drawings. A cross connecting tube J is positioned above the tubular members, said tube J being provided with short nipples $j$ which are connected by short flexible tubes $j'$ with the tubular members E F, the parts being retained in position by the upper clamping plate $e$. To a branch $k$ of the cross tube J is attached an exhausting tube K, which tube leads to a suitable exhauster, such as an air pump (not shown), said exhaust tube K being shown as a flexible tube, of rubber, and said tube being provided with a shut off or "pinch cock" K', of any suitable construction.

My invention is employed to determine the difference in the water levels prevailing on opposite sides of an orifice in a dam, which orifice is utilized for the measurement of a small stream of water flowing from the water at the higher level to the water at the lower level.

Since this difference in the elevation of water surfaces is a function of the discharge through the orifice in cubic feet per second, a proper calibration of the scale I for the particular orifice will enable the reading of the gauge to directly ascertain the flow in cubic feet per second of time. The instrument is positioned over the dam, with the feed pipes G, H, thrust into the water prevailing on opposite sides of the dam, with the lower end of tube G immersed in the water at higher level above the dam, and with the lower end of tube H immersed in water of lower level below the dam. When suction is applied by exhausting air through tube K with the pinch cock K' open, water rises through tubes G, H, and into transparent tubes E, F, respectively, to different levels in the latter due to the difference in the head on opposite sides of the dam. The difference in the water levels in the tubes E and F will always be equal to the difference in the water levels at the opposite sides of the orifice C in the dam, and this difference is readable with facility on the scale I. By releasing the pinch cock K', air is admitted through tube K into tubes E, F, so as to lower the water levels in said tubes. When the water level in tubes F, H, is lowered to the lowermost graduation on the scale I, then the water level in tubes E, G, will read on the scale the difference in elevation of the water levels at the respective sides of orifice C, and this difference in the water levels will indicate the discharge of water through the orifice C in cubic feet per second of time, it being required that the scale be properly calibrated to read directly in feet per second.

The instrument is simple in construction, efficient in operation, and economical of manufacture. The device may, if desired, constitute a permanent installation at the weir, or it may be shifted at will from place to place as required for use.

Having thus fully described the invention, what I claim as new and desire to secure by Letters Patent is:—

A gauge for measuring the volume of water flowing through an orifice in a dam or weir embodying a plurality of tubular members the intake ends of which are adapted for independent immersion in the water above and below said dam or weir, a plurality of observation tubes composed of transparent material, said observation tubes being connected with said tubular members respectively for communication therewith, a base to which the observation tubes are fixedly attached and to which said tubular members are connected at their ends adjacent to the observation tubes, a chart on the base the calibrations of which are readable through said transparent observation tubes, a connecting member uniting the upper ends of the observation tubes, and a valved exhaust connection in communication with the connecting member and with the observation tubes for exhausting air from said observation tubes concurrently and affording means for admitting air to said tubes.

In testimony whereof I have signed my name hereto this 26 day of July, 1920.

CLARENCE C. JACOB.